United States Patent [19]
Snowden et al.

[11] Patent Number: 5,252,963
[45] Date of Patent: Oct. 12, 1993

[54] "SELECTIVE CALL RECEIVER"

[75] Inventors: Gregory O. Snowden; Michael J. DeLuca, both of Boca Raton; Morris A. Moore, North Lauderdale; Robert J. Schwendeman, Pompano Beach; David F. Willard, Plantation, all of Fla.

[73] Assignee: Motorola, Inc., Schaumburg, Ill.

[21] Appl. No.: 851,113

[22] Filed: Mar. 16, 1992

Related U.S. Application Data

[63] Continuation of Ser. No. 460,699, Jan. 4, 1990.

[51] Int. Cl.$^5$ .................... H04B 5/04; H04Q 7/00; G08B 5/22
[52] U.S. Cl. .................... 340/825.44; 455/343
[58] Field of Search ............ 340/825.44, 825.47, 340/825.48, 825.57; 455/228, 343, 344, 127; 375/110, 116; 370/94.3, 100.1

[56] References Cited

U.S. PATENT DOCUMENTS

| | | | |
|---|---|---|---|
| 3,851,251 | 11/1974 | Wisner et al. | 340/825.53 |
| 4,398,192 | 8/1983 | Moore et al. | 340/825.44 |
| 4,417,246 | 11/1983 | Ashor et al. | 340/825.48 |
| 4,424,514 | 1/1984 | Fennell et al. | 340/825.52 |
| 4,449,248 | 5/1984 | Leske et al. | 340/825.44 |
| 4,453,260 | 6/1984 | Inagawa et al. | 375/116 |
| 4,459,701 | 7/1984 | Lamiral et al. | 375/110 |
| 4,479,261 | 10/1984 | Oda et al. | 455/228 |
| 4,506,262 | 3/1985 | Vance et al. | 340/825.44 |
| 4,518,961 | 5/1985 | Davis et al. | 179/2 EC |
| 4,649,538 | 3/1987 | DeLuca et al. | 371/25 |
| 4,755,816 | 7/1988 | DeLuca | 340/825.44 |
| 4,763,324 | 8/1988 | Schwierz | 375/116 |
| 4,961,073 | 10/1990 | Drapac et al. | 340/825.44 |
| 4,964,121 | 10/1990 | Moore | 340/825.44 |
| 4,996,526 | 2/1991 | DeLuca | 340/825.44 |

FOREIGN PATENT DOCUMENTS

| | | | |
|---|---|---|---|
| 57-109437 | 6/1982 | Japan | 340/825.44 |
| 61-92051 | 5/1986 | Japan | 340/825.44 |
| 62-38625 | 2/1987 | Japan | 340/825.44 |

*Primary Examiner*—Donald J. Yusko
*Assistant Examiner*—John Giust
*Attorney, Agent, or Firm*—Daniel R. Collopy; William E. Koch; Thomas G. Berry

[57] ABSTRACT

In a battery powered selective call receiver receiving a synchronous signal, a battery saving method extends battery life by optimizing the amount of time the receiver circuit is activated when searching for the signal after previously acquiring synchronization. The battery saving method allows for turning the selective call receiver on without activating the receiver circuit. The receiver circuit is activated at a time later than the energization of the selective call receiver, where the time of activation of the receiver circuit is determined in response to the time passed since synchronization was last acquired and the system signal stability.

3 Claims, 6 Drawing Sheets

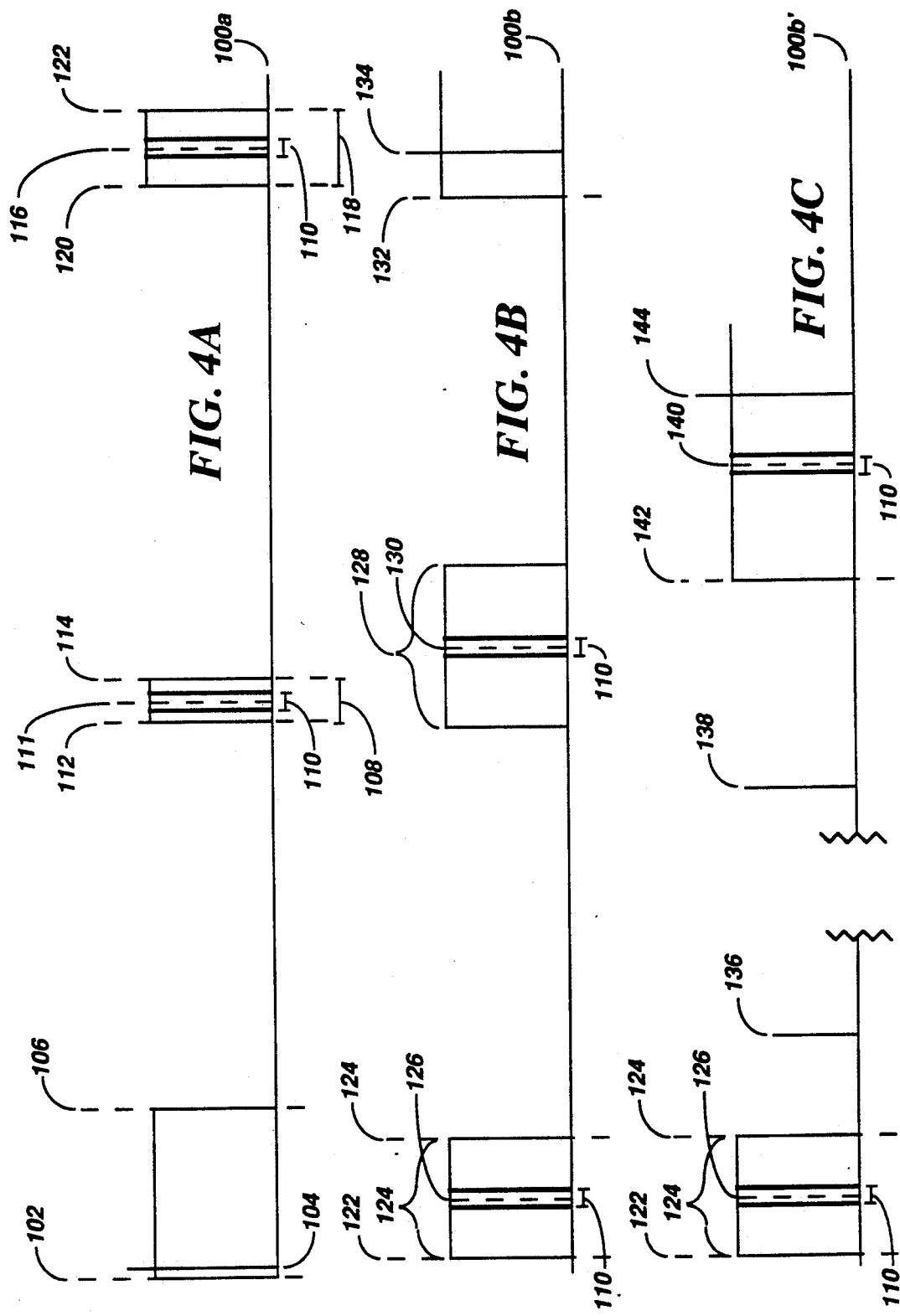

"SELECTIVE CALL RECEIVER"

This is a continuation of application Ser. No. 07/460,699, filed Jan. 4, 1990 now abandoned.

FIELD OF THE INVENTION

This invention relates in general to selective call receivers, and in particular to selective call receivers receiving synchronous signals.

BACKGROUND OF THE INVENTION

Selective call receivers generally operate using batteries to allow the selective call receivers to be portable and compact. The selective call receivers must, therefore, utilize power saving techniques such as switching the receiver circuit of the selective call receiver 'on' and 'off' in order to obtain the maximum possible life from the batteries. The 'on' time interval of the receiver circuit when the selective call receiver may potentially receive a selective call message addressed to the selective call receiver consumes power. Conversely, the 'off' interval inhibits reception of the signal by the receiver circuit, thereby conserving power. Thus, it is desirable to minimize the 'on' time interval of the receiver circuit.

When the receiver circuit looses the system signal either from the selective call receiver being out of range of the system transmitters, from being shielded by buildings, or when the channel is shared with another signal protocol, the receiver circuit typically returns to the initial synchronization acquisition mode. Regrettably, the synchronous acquisition mode is not very efficient in terms of battery life. Thus, a selective call receiver which is in a weak signal condition for a long period of time will consume a great deal of battery power to re-synchronize. Also when selective call receivers are turned 'off' and then 'on' by the user, the receiver circuit usually powers up in the synchronization acquisition mode to search for the system signal, wasting much battery power.

Thus, what is needed is a selective call receiver which conserves battery power by limiting the time which the selective call receiver operates in the power consuming synchronization acquisition mode.

SUMMARY OF THE INVENTION

In carrying out the objects of the invention in one form, there is provided a method in a selective call receiver which includes a real time clock, a nonvolatile memory, and a receiver circuit for receiving a synchronous signal having a cycle time and a system signal stability. The method comprises the steps of acquiring synchronization at a first time with the synchronous signal, storing the first time as a stored value in the nonvolatile memory, de-energizing the selective call receiver, energizing the selective call receiver at a second time without activating the receiver circuit, and activating the receiver circuit to search for the synchronous signal at a third time later than the second time. The third time is determined in response to the real time clock, the stored value, the cycle time and the system signal stability.

BRIEF DESCRIPTION OF THE DRAWING

FIGS. 4A–4C are timing diagrams of the operation of the preferred embodiment of the present invention.

DETAILED DESCRIPTION OF THE INVENTION

Figure 1:
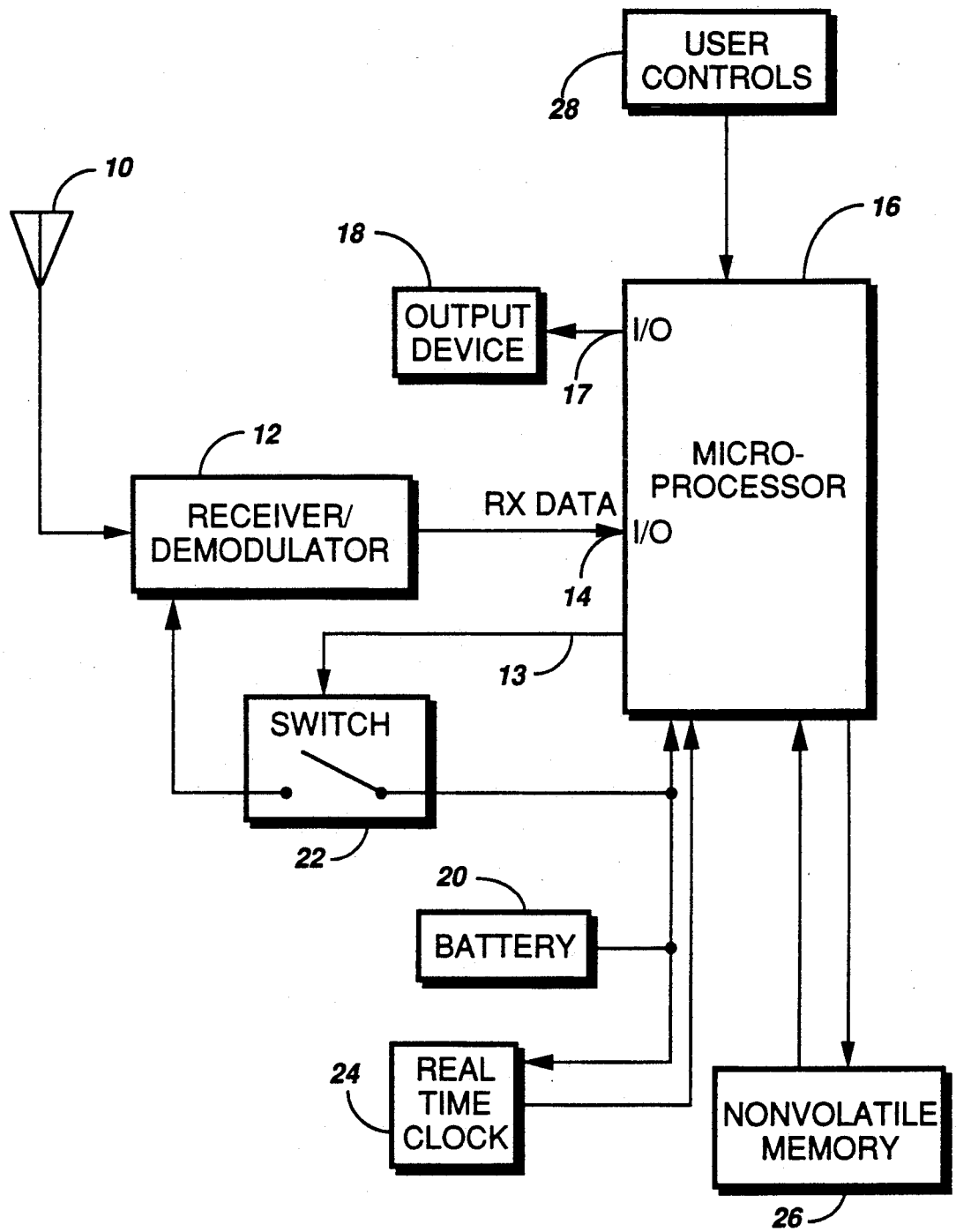
FIG. 1 is a block diagram of a selective call receiver according to the present invention.

Referring to FIG. 1, a selective call receiver receives signals via an antenna 10. A receiver/demodulator circuit 12 demodulates the received signals on one of a plurality of frequencies and provides the demodulated signals to a data port (RX DATA) 14 of a microprocessor 16. The microprocessor 16 includes at least one other input/output (I/O) port 17 and is programmed to acquire synchronization to and decode a selective call network signalling protocol. Acquiring synchronization comprises two steps: acquiring bit synchronization and acquiring frame synchronization. Bit synchronization is a process used to determine the location of bit boundaries of a data transmission having bits transmitted at a predetermined baud rate, and thereafter, to provide a clock to synchronously sample the bits. Frame synchronization frames the bits transmitted so that the data transmitted is in a form to be decoded thereby indicating various word boundaries such as the first bit of address and data signals. Methods for acquiring synchronization to asynchronous signalling protocols are described in U.S. Pat. Nos. 4,506,262 and 4,424,514. When synchronization has been acquired, the receiver's selective call address has been detected, and the signal has been decoded, an output is provided to an output device 18 via the I/O port 17. The output device 18 could be an audio amplifier and a speaker for providing audio output or a liquid crystal display (LCD) for providing a visual output.

A battery 20 supplies power for operation of the selective call receiver, and particularly for operation of the microprocessor 16 and the devices of the receiver/demodulator circuit 12. A switch 22 activates and deactivates the receiver/demodulator circuit 12 (i.e., switches the receiver circuit 'on' and 'off') in response to a signal 13 received from the microprocessor 16. A clock 24 supplies timing signals to the microprocessor 16 for operation of the synchronization acquisition and other routines. The clock 24 is powered by the battery 20 and, in the preferred embodiment, is a real time clock for maintaining time even when the selective call receiver is de-energized (i.e., turned off). A memory 26 is used for the storage of information necessary to the operation of the routines of the present invention which produce the signal controlling switch 22. In the preferred embodiment, the memory 26 is a nonvolatile memory capable of being written into and read from by the microprocessor 16. User selectable controls 28 allow the user to command the microprocessor controller 16 to perform the selective call receiver operations well known to those skilled in the art. The user controls 28 typically include control switches such as an ON/OFF control button for energizing and de-energizing the selective call receiver. For a more detailed description of the fundamental structure and operation of selective call receivers, reference is made to U.S. Pat. No. 4,518,961, U.S. Pat. No. 4,649,538, and U.S. Pat. No. 4,755,816, all commonly assigned to the same assignee as the present invention, and the teachings of which are hereby incorporated by reference.

Figure 2A:
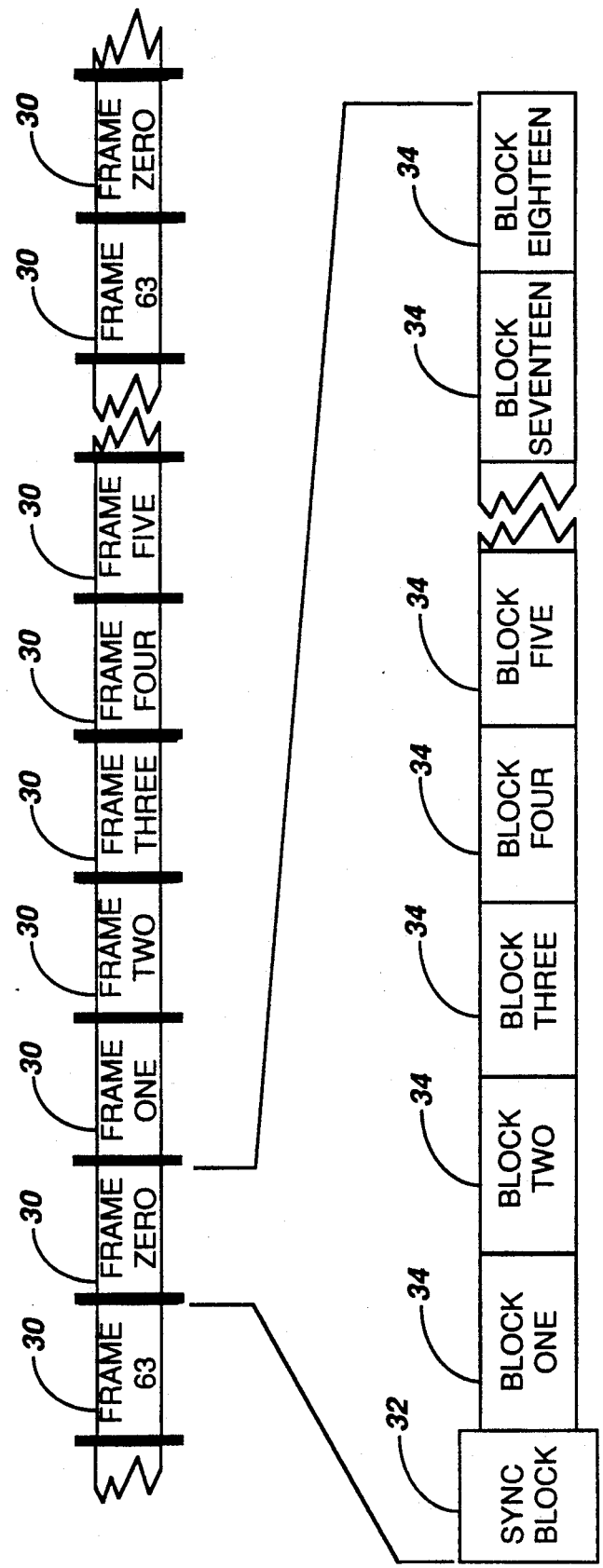
FIGS. 2A and 2B are diagrams of the synchronous signalling protocol of the preferred embodiment of the present invention.
Figure 2B:
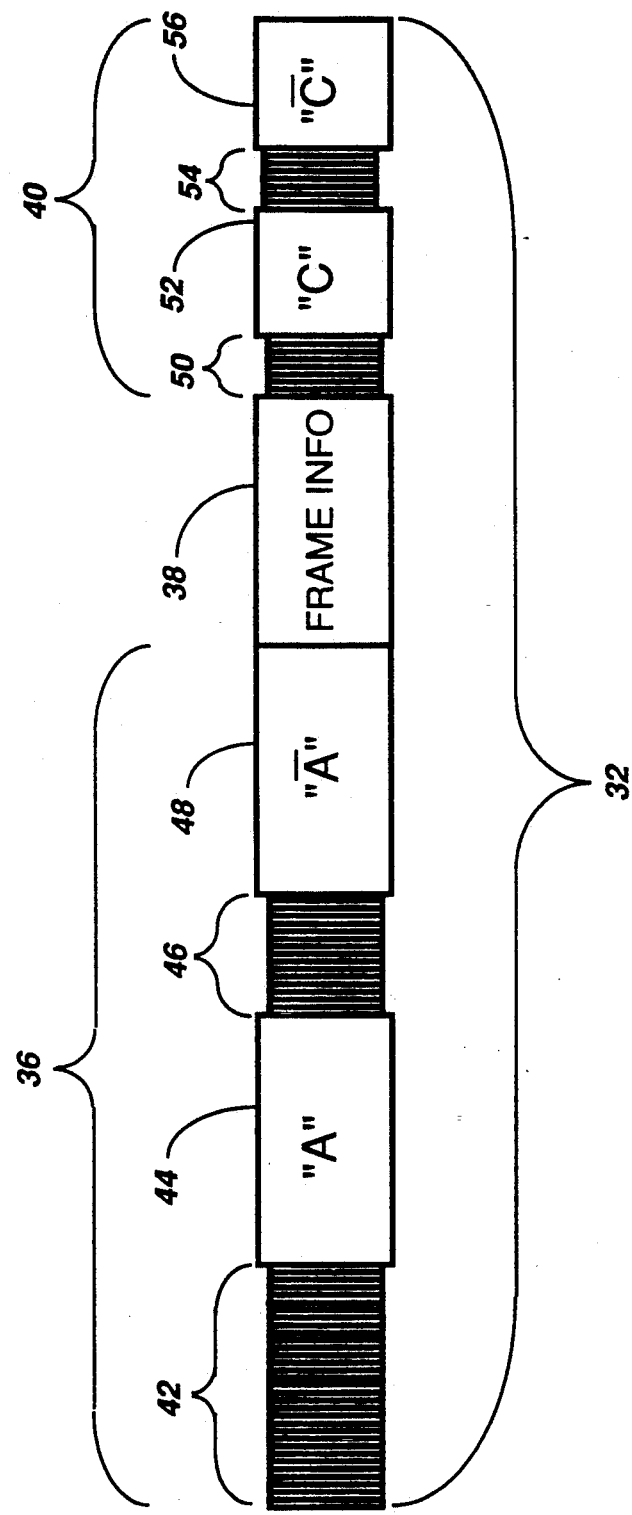

Referring to FIGS. 2A and 2B, the synchronous signalling protocol of the preferred embodiment comprises a system of sixty-four rotating frames 30. Each frame 30 in turn comprises a synchronization (sync) block 32 and eighteen information blocks 34. The time for the system to cycle, i.e. for the sixty-four frames 30 to be transmitted, is 256 seconds with four seconds for each frame 30. The information blocks 34 contain selective call addresses and data and, in some cases, system overhead information.

Referring to FIG. 2B, portions of the sync block 32 of each frame are sent at a predetermined baud rate and may convey the baud rate information necessary to decode the eighteen information blocks. The sync block 32 also comprises synchronization information to allow the selective call receiver to acquire bit and frame synchronization. In the preferred embodiment, the sync block 32 comprises 192 bits when transmitted at 1200 baud for a total of 160 milliseconds (msec) transmission time. The 192 bits comprise a bit and frame synchronization portion 36, a (32,21) BCH word 38 comprising frame information, and information block bit and frame synchronization portion 40. Portion 36 is utilized to acquire bit and frame synchronization. A thirty-two bit pattern 42 of alternating ones and zeros is utilized for acquiring bit synchronization and a (32,21) BCH word "A" 44 conveys the baud rate used to transmit the information blocks and provide frame synchronization. An additional sixteen bit one/zero pattern 46 aids bit synchronization and a (32,21) BCH word "inverted A" 48 is used for redundancy. Portion 40 is transmitted at the baud rate of the information blocks to allow for bit and frame synchronization at the information block baud rate. In like manner to the bit and frame synchronization of portion 36, portion 40 comprises a plurality of bits 50 and a second plurality of bits 54 for bit synchronization. A sixteen bit pattern "C" 52 and "inverted C" 56 are transmitted to allow the selective call receiver to acquire frame synchronization for decoding the subsequent information blocks. At 1200 baud, the pluralities of bits 50 and 54 comprise eight bits each.

Figure 3A:
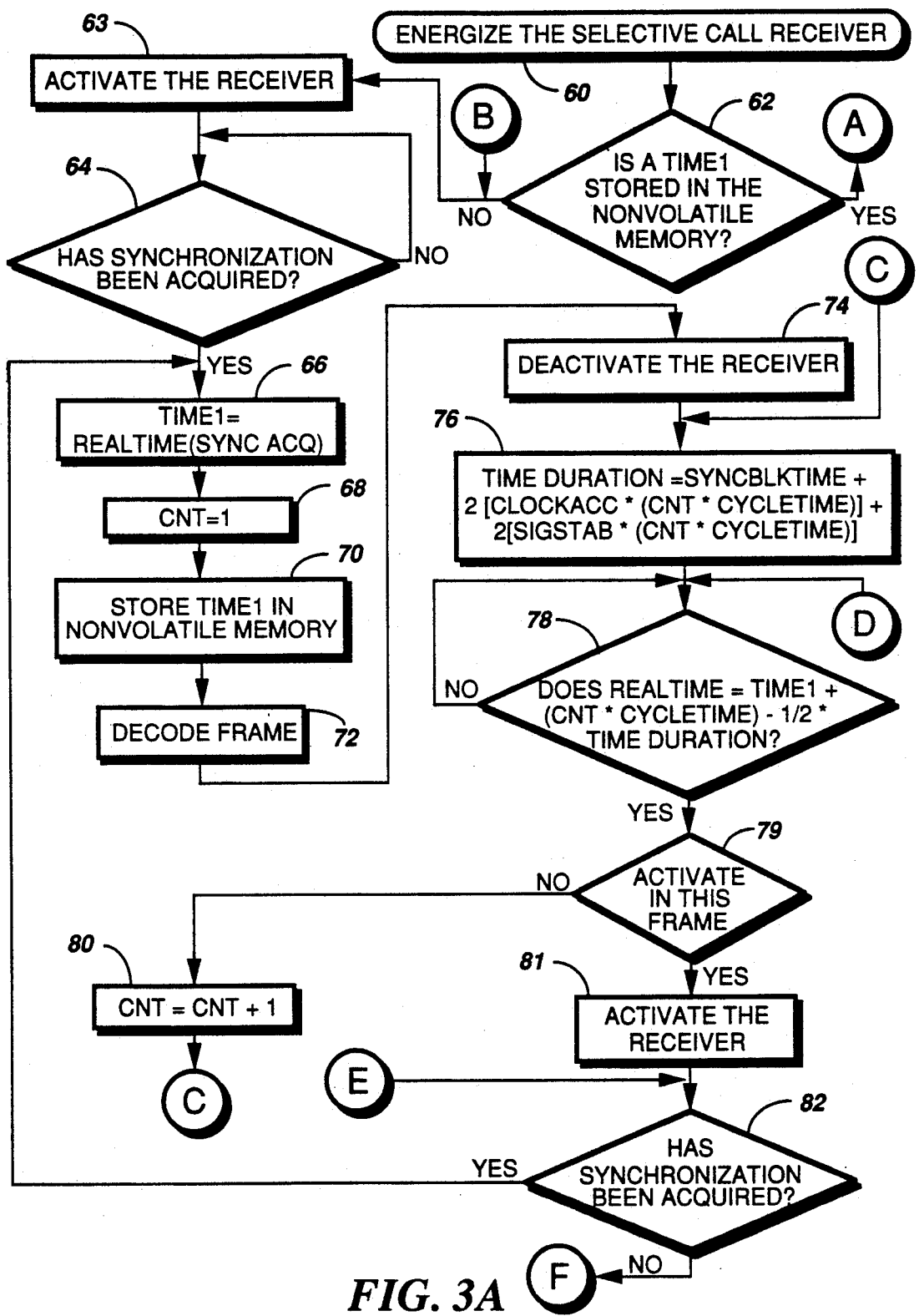
FIGS. 3A and 3B is a flowchart of the operation of the microprocessor of the preferred embodiment of the present invention.
Figure 3B:
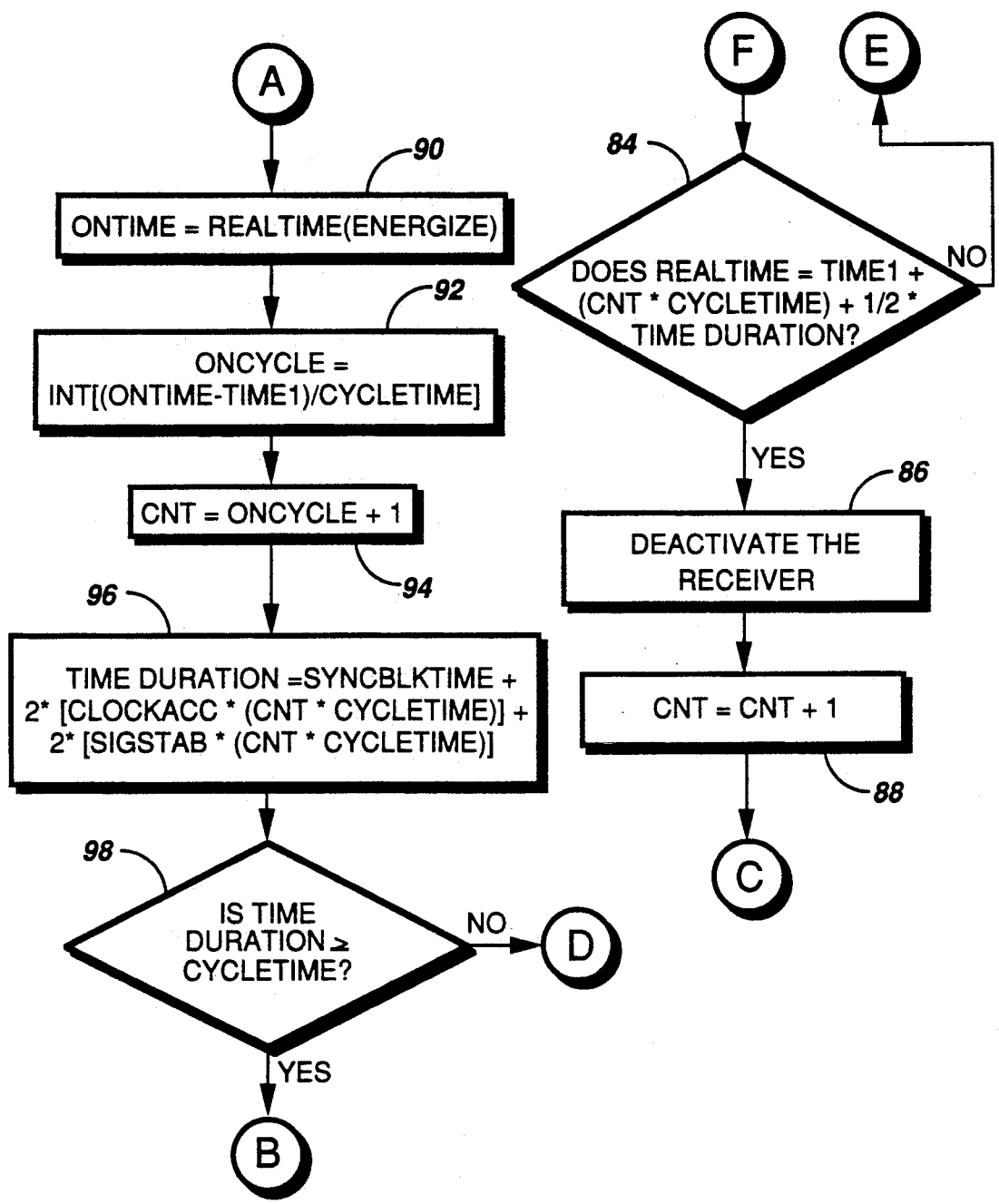

Referring to FIGS. 3A and 3B, the operation of the battery saving routine of the microprocessor of the present invention begins when the selective call receiver is energized 60, i.e., when the user turns the ON/OFF switch ON. Next, the microprocessor 16 polls the nonvolatile memory 26 to determine whether a value TIME1 is stored therein 62. TIME1 is a value indicating at what time, as measured by the real time clock 24 (FIG.1), the selective call receiver last acquired synchronization. If no value for TIME1 is stored in the memory 26, step 62, the receiver/demodulator 12 (FIG. 1) is activated and the battery saving routine determines whether synchronization has been acquired with the synchronous signal 64. The battery saving routine operates in a loop until synchronization has been acquired 64. The process of acquiring synchronization may have a different battery saving routine.

When synchronization has been acquired 64, the value TIME1 is set equal to the value REALTIME of the real time clock 24, at the time of synchronization acquisition (SYNC ACQ) 66 which corresponds with the center of interval 36. A counter CNT, which counts the number of synchronous signal cycles is initialized to one 68, and TIME1 is stored in nonvolatile memory 70.

The eighteen blocks 34 are decoded in step 72. Power conservation may be performed while receiving blocks 34 based on a signal included therein. Additionally, blocks 34 may include information instructing the receiver to only activate in certain frames.

Since the signalling protocol utilized in the present invention is a synchronous signalling protocol, the battery saving routine can predict with some degree of accuracy when the next sync block 32 (FIG. 2A) of interest to the receiver will be transmitted. The frame is decoded 72 and the receiver circuit is deactivated 74 by generating a signal 13 from the microprocessor 16 to the switch 22 (FIG. 1), which opens the switch 22. Next, a value TIME DURATION which determines the amount of time that the receiver circuit is activated to attempt to reacquire synchronization is calculated 76. In the present invention, TIME DURATION is the sum of three values: the transmission time of the 116 bits of the portion 36 of the sync block 32 represented as the constant SYNCBLKTIME; twice the deviation due to the accuracy of the real time clock 24 calculated as a constant CLOCKACC, representative of the amount of time the clock loses or gains in a unit of time, multiplied by the product of the counter CNT times a constant CYCLETIME, which represents the amount of time for one frame; and twice the deviation due to the system signal stability calculated as a constant SIGSTAB, representative of the amount of frequency or period shift the synchronous signal experiences in a unit of time, multiplied by the product of the counter CNT times CYCLETIME. The calculation of TIME DURATION can therefore be expressed as the equation:

TIME DURATION=SYNCBLKTIME+2[CLOCK-ACC*(CNT*CYCLETIME)]+2[SIG-STAB*(CNT*CYCLETIME)].

The constant CLOCKACC, being a function of the selective call receiver's circuitry, particularly the real time clock 24 (FIG. 1), would be stored in the nonvolatile memory 26 (FIG. 1). The constants of the system, SIGSTAB and CYCLETIME, would also be stored in the memory 26. SIGSTAB and CYCLETIME could be stored in the memory 26 when the receiver is initially put into service or, alternatively, could be values transmitted as a selective call message in a frame of the signal, decoded 72 (FIG. 2), and stored in the memory 26 prior to use in processing 76.

In the preferred embodiment, SYNCBLKTIME equals 96.7 milliseconds (msec) since the 116 bits are transmitted at 1200 baud. CYCLETIME equals four seconds, the amount of time to transmit one frame 30 (FIG. 2A). In other embodiments, CYCLETIME may comprise other frame times and may also represent a multiple of frames. If the clock loses one second every thousand seconds, then CLOCKACC equals 0.001. If the signal system stability indicates that for every ten million bits transmitted the synchronous signal shifts one bit, then SIGSTAB equals 0.0000001. Using the above values, in the first synchronous signal cycle, TIME DURATION would equal 104.7 msec. Each successive increment of CNT by one would increase TIME DURATION by 8 msec, a factor of worst case shifting between the real time clock in the selective call receiver and the system signal. It can be seen that the effect of the deviation due to the accuracy of the signal stability is minimal compared to the real time clock for this example. In an alternate embodiment, the signal stability could be expected to be on the order of two parts per million (ppm) and the selective call receiver stability (which is the accuracy of the clock 24 (FIG. 1) on the order of thirty ppm.

After the calculation of TIME DURATION 76, the battery saving routine enters a loop 78 until a time specified by the equation:

$$TIME1+(CNT*CYCLETIME)-\tfrac{1}{2}*TIME\ DURATION$$

as shown at decision block 78. Since TIME DURATION specifies the time width of a window during which the receiver is activated to search for the signal, and in particular for the sync block 32 (FIG. 2A) of the signal, the equation represents a time one-half the width of the receiver activated time window before the number (CNT) of cycles times CYCLETIME after last acquiring synchronization (TIME1).

Upon the equality of step 78, step 79 determines whether or not to activate the receiver in this frame. The determination may be the result of the signal received at step 72, from information stored in the code plug in the pager or from another signal received in the transmission and the frame number. The counter is then incremented by one 80 and the operation returns to step 76.

If the receiver 81 is activated, the routine determines whether synchronization has been acquired 82. If synchronization is acquired, TIME1 is redefined 66, CNT is reinitialized 68, and processing continues as described above. If synchronization is not acquired within the time window defined by TIME DURATION 84, i.e., if synchronization is not acquired by the time described by the equation:

$$TIME1+(CNT*CYCLETIME)+\tfrac{1}{2}*TIME\ DURATION$$

as shown in decision block 84, the receiver is deactivated 86 by applying a signal to close the switch 22 (FIG. 1). The counter CNT is incremented by one 88 and the operation of the battery saving routine returns to calculate a new TIME DURATION 76.

Another aspect of the present invention allows for battery saving when initially acquiring synchronization after the selective call receiver has been turned on (energized) 60. If a value for TIME1 is stored in the non-volatile memory 62, a variable ONTIME is set equal to the value of the real time clock 24 (FIG. 1) at the time the selective call receiver is turned on (ENERGIZE) 92. A second variable ONCYCLE is set equal to a function (INT[]) of the difference between ONTIME and TIME1 divided by CYCLETIME 94. The function divides the difference in times by the signal cycle time and removes the remainder to obtain an integer result indicative of which signal cycle after last acquiring synchronization the selective call receiver energized. CNT is set equal to the next cycle 94 and the time width of the window for activating the receiver (TIME DURATION) is calculated as described above 96.

If the window is greater than or equal to a selectable multiple (1/N) of the signal cycle time, it is determined that no benefit of battery power conservation would be gained by using the battery saving routine. Thus the receiver is activated 63 and the routine enters the idle loop awaiting synchronization acquisition 64. For example if N equals one, then the time window would require the receiver to be constantly activated and no benefit would be gained by utilizing the battery saving routine. An N of two would provide for a fifty percent battery saving duty cycle.

If the window is not greater than or equal to N times the signal cycle time, then processing enters the loop 78 in the battery saving routine awaiting the time value of clock 24 (FIG. 1) to equal TIME1 plus (CNT times CYCLETIME) minus one-half TIME DURATION 78.

Referring next to FIG. 4, a timing diagram of the functioning of the receiver 12 during the operation of the battery saving routine is shown on lines 100a, 100b and 100b', where time increases from left to right. At time 102, the receiver 12 is activated and remains in the synchronization acquisition loop 64 (FIG. 3A) until time 104 (TIME1) when synchronization is acquired. The receiver then remains activated during the decoding of the frame 72 until instructed to turn off by information within the frame or the end of the frame is reached 74 at time 106.

While the receiver is deactivated the width of a time window 108 to search for the synchronous signal is calculated (TIME DURATION) 76 (FIG. 3A). The standard time width of the sync block, SYNCBLKTIME, is shown as 110 and the end of the first cycle, i.e., TIME1 plus CYCLETIME, is time 111. The receiver is then activated 80 (FIG. 3A) at time 112, i.e., when the real time clock has reached a value defined as:

$$TIME1+(CNT*CYCLETIME)-\tfrac{1}{2}*TIME\ DURATION$$

shown at step 78, FIG. 3A. The receiver is deactivated at time 114 as no signal is found by the receiver 12.

The second cycle ends at time 116 and a time window 118 is calculated for activation of the receiver 12 at time 120 to search for the signal and deactivation of the receiver 12 to inhibit reception at time 122, where the time window is centered on the completion of the second cycle 116. Similarly, a third time window 124 to search for the signal is centered on the end of a third cycle at time 126 and a fourth time window 128 is centered on the end of a fourth cycle at time 130.

At time 132 the receiver is activated for a fifth time window to search for the signal. The signal is detected and, at time 134 synchronization is acquired thus beginning the process over again.

Alternatively, it is shown that the selective call receiver could be de-energized on time line 100b'. After deactivation of the receiver at the close of the third time window 124, the selective call receiver is de-energized at time 136. Some time later, at time 138, the selective call receiver is energized. The location of the next end of cycle 140 is determined and a time window is calculated whereby the receiver 12 is activated at time 142. The receiver detects the signal and synchronization is acquired at time 144, once again beginning the process over.

After acquiring synchronization the first time followed thereafter in the absence of the signal, the receiver adjusts its acquisition only enough to compensate for system stability. Thus, it can be seen that the present invention results in substantial power conservation over conventional selective call receiver battery saving modes which typically have a fifty percent duty cycle. Though the amount of receiver activation time increases over time, the increase is small because it depends on the accuracy of the real time clock and the stability of the system signal. In our example above, the activation of the receiver would not approach a fifty percent duty cycle until TIME DURATION equalled two seconds, one-half of the cycle time. With SYNCBLKTIME equal to 160 msec and TIME DURATION increasing by one msec every cycle, the battery power consumption of the present invention would not begin to equal that of a conventional selective call receiver until 1,840 cycles have passed during which a continually energized selective call receiver does not detect the synchronous signal. A further improvement would allow for the fifty percent duty cycle to take over at that time so that battery consumption would never be worse than the present fifty percent duty cycle receivers. Also, to avoid a worse than fifty percent duty cycle upon energizing a selective call receiver, a further improvement would allow for the receiver to periodically reacquire synchronization even when the selective call receiver is de-energized.

We claim:

1. In a selective call receiver including a real time clock, a nonvolatile memory, and a receiver circuit for receiving a synchronous signal having a cycle time and a system signal stability, a method comprising the steps of:

acquiring synchronization at a first time with the synchronous signal;

storing said first time as a stored value in said nonvolatile memory;

de-energizing said selective call receiver;

energizing said selective call receiver at a second time without activating said receiver circuit; and activating said receiver circuit to search for said synchronous signal at a third time later than said second time, said third time determined in response to said real time clock, said stored value, said cycle time and said system signal stability.

2. The method of claim 1, wherein said synchronous signal comprises bit synchronization signals, each bit synchronization signal having a predetermined time duration, the method further comprising after the step of energizing said selective call receiver the step of calculating said third time, said third time calculated from time elapsed since a time substantially equivalent to said stored value, said cycle time, said system signal stability, and said predetermined time duration.

3. The method of claim 1 further comprising after the step of de-energizing said selective call receiver and before the step of energizing said selective call receiver the steps of:

reacquiring synchronization at a fourth time;

storing said fourth time as said stored value in said nonvolatile memory, thereby overwriting said stored value previously stored therein; and repeating said steps of reacquiring synchronization and storing said fourth time until said selective call receiver is energized.

* * * * *

UNITED STATES PATENT AND TRADEMARK OFFICE
CERTIFICATE OF CORRECTION

PATENT NO. : 5,252,963

DATED : October 12, 1993

INVENTOR(S) : Gregory O. Snowden, Boca Raton Florida; Michael J. DeLuca, Boca Raton Florida It is certified that error appears in the above-indentified patent and that said Letters Patent is hereby corrected as shown below:

On the title page: Item

[75] Inventors: Please delete "Morris A. Moore, North Lauderdale; Robert J. Schwendeman, Pompano Beach; David F. Willard, Plantation, all of Fla.".

Signed and Sealed this

Third Day of May, 1994

Attest:

BRUCE LEHMAN

*Attesting Officer*     *Commissioner of Patents and Trademarks*